April 10, 1951  W. H. HALL  2,548,307
SLIP COUNTER
Filed June 1, 1949
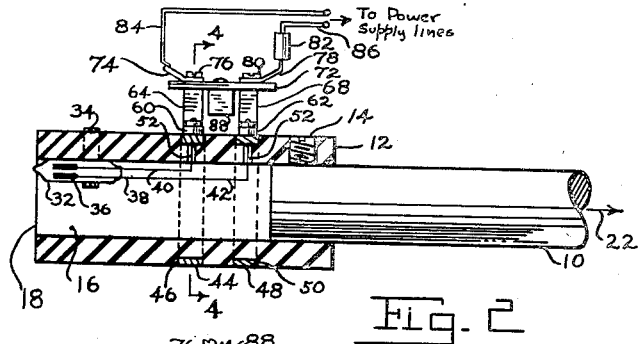
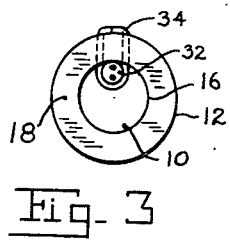
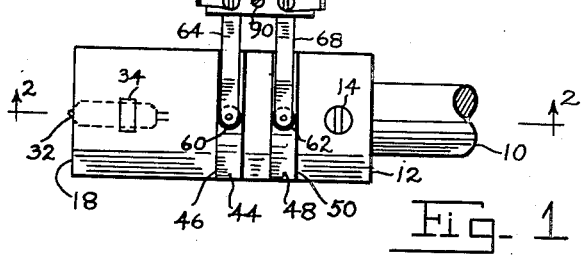
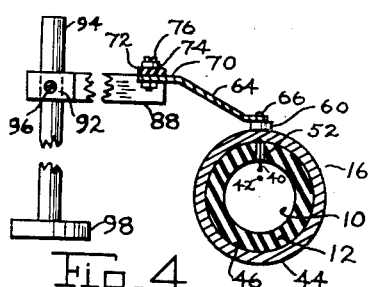
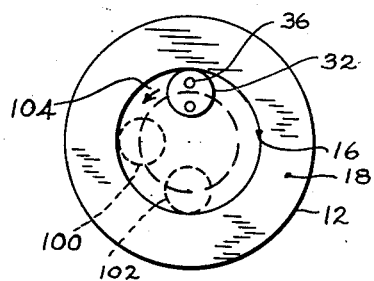
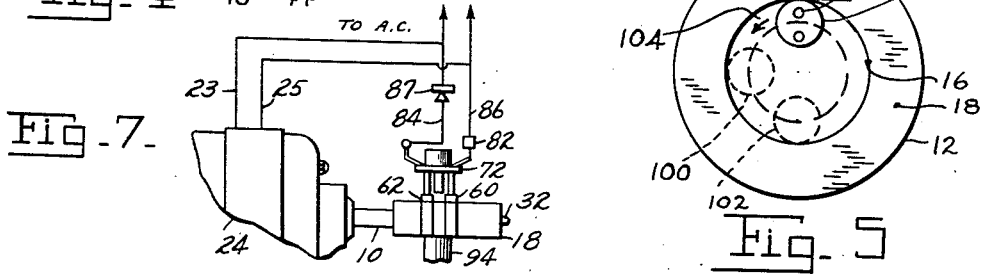
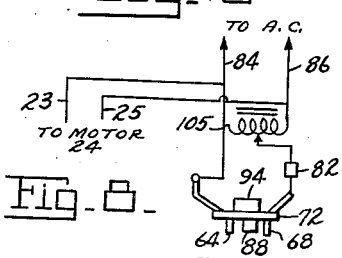
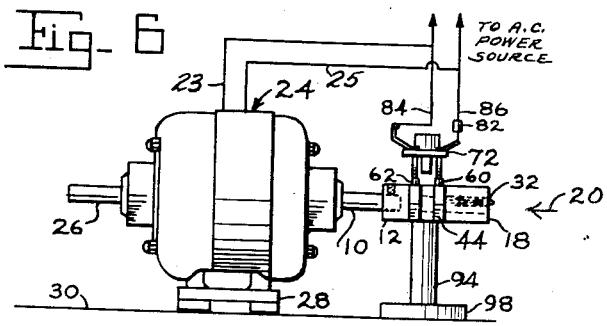
INVENTOR.
WILLIAM HANSEN HALL
BY
Peter Fries, Jr.
ATTORNEY.

Patented Apr. 10, 1951

2,548,307

UNITED STATES PATENT OFFICE 2,548,307

SLIP COUNTER

William Hansen Hall, College Station, Tex.

Application June 1, 1949, Serial No. 96,554

12 Claims. (Cl. 172—120)

This invention relates to electric motors and means for determining the slip thereof while the same are rotating.

An object of the invention is to provide an electric motor of a novel type, the degree of slip of which may be determined by inspection during its rotation.

Another object of the invention is to provide means adapted for mounting upon a rotating portion of an electric motor for rotation therewith, whereby the slip, if any, of said motor may be readily observed visually and accurately determined.

A further object of the invention is to provide a slip counter including a housing mountable upon the shaft of an alternating current motor which is subject to deviation from synchronous speed, with illuminating means disposed in said housing and visible therein being rotatable with said shaft so as to describe a circle of substantial radius about the axis of said shaft, said illuminating means being connectable to a source of non-uniform cyclic current and adapted for being actuated by said source at regular intermittent intervals during its rotation, and being thus intermittently illuminated, to disclose the presence of slip in said motor and thus permitting the determination of the slip thereof.

Still another object of the invention is to provide an improved slip counter for electrically actuated rotating devices, whereby the slip may be observed and determined visually in a normally illuminated room without the need for reducing the level of general illumination therein.

Still a further object of the invention is to provide a novel and improved slip counter that is simple in design and structure, and may be adapted for use with electric motors without any alteration of such motors or interference with their motive functions.

Another object of the invention is to provide a teaching aid whereby the concept and actuality of existence of slip in alternating current motors may be physically demonstrated for visual observation by the student, permitting him to actually see what takes place and to determine actual slip accurately without the need for elaborate and expensive speed counting devices.

Other objects and advantages of the invention will become apparent from the following description of a preferred embodiment thereof as illustrated in the accompanying drawings, and in which, Figure 1 is a top plan view partly in fragment, showing my improved slip counter disposed in operative position upon the shaft of an alternating current motor the slip of which is to be determined thereby.

Figure 2 is a longitudinal sectional elevation taken on plane 2—2 of Figure 1.

Figure 3 is an end elevation such as might be seen when looking at Figure 2 from the left, the contact making parts being omitted for purposes of clarity of illustration.

Figure 4 is a transverse sectional elevation taken on plane 4—4 of Figure 2, omitting the upper wiring shown clearly in Figure 2.

Figure 5 is an enlarged view similar to that of Figure 3, but indicating successive positions at which the neon lamp is illuminated when slip is present.

Figure 6 is an elevational view of an alternating current motor with my improved slip counter mounted thereon for indication and measurement of the slip thereof, but omitting illustration of the load driven by the motor, such being conventional and well known.

Figure 7 is a fragmentary view similar to that of Figure 6, except that it shows a modification in which a half wave rectifier is inserted in the power lead to the glow lamp.

Figure 8 is a fragmentary view similar to that of Figure 6, except that it shows a modification in which a variable auto-transformer is inserted between the power lines and the glow lamp to vary the voltage thereon.

In the use of rotating electric machines, such as induction motors and the like, it is important to determine the characteristics of the motor under load, such as, for example, the slip. As is well known in the art, the speed of the revolving field of the motor is called the synchronous speed, and the percentage by which the speed of the rotor or secondary of the motor falls below this synchronous speed is called the slip. If $2p$ represents the number of poles, and $f$ the frequency, the synchronous speed in revolutions per minute of the motor shaft is $$R_0 = 60f/p \qquad (1)$$

Synchronous speed in an induction motor corresponds to that speed of a direct current shunt wound motor at which the counter E. M. F. is just equal to the impressed electromotive force. In fact, the mechanical characteristics of the two motors are practically identical, within their working range. For example, starting with the rotor at nearly synchronous speed, assume a load to be applied at the pulley. The speed will drop; the rate at which the secondary conductors cut (or slip backward through) the revolving field will increase; and the induced electromotive force, the current and the torque will increase until the increase in torque just meets the demand imposed by the load. All this is analogous to the operation of the shunt motor, although those skilled in the art will understand that, strictly speaking, there could not be "synchronous speed" in the shunt motor since it has no rotating flux field. In any event, following the analogy, there is one important difference. In the induction motor, as the slip increases, the frequency and therefore the leakage reactance of the secondary increases in direct proportion.

This results in an increasing lag of the secondary current behind the flux by which its E. M. F. is induced, and means, therefore, a decreasing effectiveness of the secondary current in torque production.

Beyond a certain point, the increase of slip and slip voltage with load, is accompanied by an almost proportional increase of impedance, so that the secondary current ceases to increase with the slip at the same time that its torque effectiveness is decreasing. Thus there is a point or slip beyond which the torque actually decreases, causing the motor to stop. In modern, well constructed and designed motors, this stalling torque is largely in excess of the torque at its rated load. The subject of the slip of an induction motor is thus recognized to be of great importance, both to the designer and manufacturer, and also the ultimate user of the motor. It is also of vital importance in the engineering schools, to illustrate not only by definition that slip exists, but also to actually demonstrate its existence upon the actual rotating machine in a visual manner. The present invention permits this to be done quite effectively and in a manner which will not soon be forgotten by the student and the engineer in the audience, and further permits actual determination of the slip visually, and without the need for complicated and expensive instruments.

The slip of a rotating alternating current machine has been defined as the difference between its speed and the synchronous speed, divided by the synchronous speed, the slip being usually expressed in per cent.

In order to understand clearly the nature of the invention, reference may now be had to the drawings, in which like numerals denote similar parts throughout the several views.

As seen in Figures 1 and 2, there is a rotatable shaft 10 of a motor 24 illustrated in Figure 6, the motor being, for example, an alternating current induction motor, or other type of motor the slip of which is to be determined and observed. The motor is connected by wires 23 and 25 to the alternating current supply lines, and has a base 28 supported upon a table top 30 or other supporting surface, and may have its shaft of the double ended type shown in Figure 6, with a pulley or coupling, not shown, engaging its other shaft end 26 for driving a load. Although for clarity of illustration, a double ended shaft motor is shown in Figure 6, it will be understood that the invention is likewise applicable to those motors having only a single protruding shaft like that shown at 10, and that a load pulley or coupling may be mounted on the shaft 10 also.

A slip counter housing 12, in the form of a hollow cylindrical tube preferably of insulating material, with an axial bore 16 extending therethrough, is disposed upon the outer end of the motor shaft 10, being secured in position by means of a set screw 14 or otherwise, for rotation with the motor shaft, the arrow 22 in Figure 2 indicating the location of the motor 24, as in Figure 6 by which its shaft 10 is rotated.

It is thus obvious, as seen best from Figures 2 and 3, that the outer end 18 of the axial bore of the housing 12 remains open to view. A small tubular neon bulb 32 having a transparent glass envelope enclosing spaced electrodes 36 and filled with neon gas, with the electrodes connected at 38 to lead wires 40 and 42, is secured in position as shown, eccentrically of the axis of the tube 12, and against the inner surface of the tube bore 16. The neon glow tube 32 is held in position by any suitable means, such as by a metallic band or wire 34 partly encircling the neon tube body and extending through openings formed through the insulating tube 12 and bent over on the outside as seen best in Figure 3, to hold it securely in position against dislodgment.

Annular slip rings 44 and 48, formed of good electrical conductor material such as copper, are disposed respectively in outwardly open peripheral spaced grooves 46 and 50, for rotation with the insulating tube 12 and the motor shaft 10, the wires 40 and 42 extending respectively through radial openings 52 as shown best in Figure 2, and forming electrical connection with the inner surfaces of their respective slip rings to connect the electrodes of the neon tube 32 therewith.

A brush holder 88 of insulating material, also shown in Figure 4, is secured by means of a screw 90, to a cross arm 72, also of insulating material, for supporting the same. Resilient spring fingers 64 and 68, formed of good electrically conductive material, such as spring steel, bronze, or beryllium-metal alloys, are secured in spaced relationship to the underside of the cross arm 72, by means of bolts 76 and 80 respectively, which also hold in position the soldering lugs 74 and 78 respectively. Underlying the distal ends of these spring fingers are conductive contact brushes 60 and 62 respectively, the brushes being secured to the spring fingers by means of pins 66 or other well known means, and adapted to ride slidably upon the slip rings 44 and 48 respectively, disposed radially thereunder with respect to the axis of the housing tube 12, so as to conduct electrical current to the electrodes of the neon glow tube 32 as it rotates.

The soldering lugs 74 and 78 are connected by wires 84 and 86 respectively, to the available power lines, as indicated clearly in Figure 2. These power lines may, if desired be the same alternating current lines which supply power to wires 23 and 25 for driving the alternating current motor 24. Or they may be the unfiltered output of a rectifier 87 connected to the alternating current power lines, for reasons which will be explained below, and are apparent to those skilled in the art. As seen in Figures 2 and 6, a ballast resistor 82 is disposed in series with the wire lead 86, as is customary in connection with the use of neon glow lamps.

Since the proximal ends 70 of the spring fingers are bent into the plane of the lower surface of the cross arm 72, as seen in Figure 4, and because of the inherent resilience thereof, sufficient contact pressure by the brushes 60 and 62 will always be maintained during rotation of the motor shaft. These brushes 60 and 62 are shown as circular discs and may be of nickel silver, coin silver or the like, or tungsten alloys, well known in the art. They may also be formed of other well known brush materials such as compacted carbon or other materials.

For convenience, the brush holder 88 may be secured by a clamp 92 with set screw or wing screw 96, to an upright supporting post 94 in any suitable manner, the post 94 having, for example, a stable base 98, as seen in Figures 4 and 6, which may rest upon the floor of a room, or, as seen best in Figure 6, upon the same surface 30 as supports the motor 24, which may be a table top, or the floor. It will be apparent to those skilled in the art, that the cross arm 72, bearing the spring fingers, may also be mounted directly upon the motor 24 itself by means of a convenient bracket, if desired, so as to extend outwardly over the slip rings 44 and 48, with suitable connection to the power lines.

The neon bulb 32 may be of a very small type, rated at only 1/25 watt and well known in the art and made by leading electrical lamp manufacturers such as the General Electric Company, of Schenectady, N. Y. As an example, the neon bulb 32 may have a diameter of about ¼ inch and be mounted inside a tubular housing 12 the inside diameter of which is about one inch. From Figure 5, it will be seen that as the housing tube 12 rotates with the motor shaft 10, the neon tube 32 describes a circle, indicated in dotted lines, in each revolution of the shaft.

Consideration may now be given to the operation of the neon lamp 32. As is well known in the art, assuming the lamp to be supplied by alternating current, the lamp will glow for only a fraction of the time of each half cycle of the alternating current, which may be represented as a sine curve for a single complete cycle. As the voltage increases from zero on the upper half of the cycle, light from the neon lamp does not glow or become visible until a certain ionizing potential has been reached, and then it remains glowing while the voltage increases to maximum for the cycle and then decreases to the minimum ionizing potential, whereupon the glow is extinguished. The lamp remains unlighted from then on while the voltage continues to decrease through zero voltage and builds up in the opposite direction below the X axis until once again the ionizing potential is reached, and then it again glows and remains lighted while the voltage is passing through the negative maximum and again decreases toward zero, until the negative minimum ionizing potential is reached, and then the lamp ceases to glow while the voltage decreases toward the X axis to zero, ending the cycle under consideration.

Hence, as is well known in the art, the neon lamp 32 glows or flashes at a rate twice the frequency of the supply lines to which it is connected, that is to say, twice each cycle. The actual time the neon bulb glows may be changed by changing the voltage applied thereto.

If this neon bulb 32 is mounted on a shaft, as shown in Figure 2, the shaft rotating with the bulb, and the neon bulb glows when in one position, as, for example, at the upper full line position of the bulb 32 in Figure 5, it will glow again in the same position when the shaft has made one revolution, if the shaft 10 is turning at synchronous speed. Hence, under such circumstances of rotation at synchronous speed, the spot of light, so called, given out by the neon bulb 32, will appear to be stationary, and there will be no slip. That is to say, the lamp 32 will only glow when it is in the solid line position of Figure 5, upon each revolution.

If, however, the shaft 10 of the motor is turning at less than synchronous speed, the neon light 32 will glow again before it reaches its original position, that is to say, at one of the dotted line positions on the dotted circle of Figure 5, as, for example, position 100, or 102, or some other position not shown but displaced from that shown in full lines in this view, and hence the "spot of light" from the neon bulb 32 will appear to be revolving slowly about the axis of the motor shaft. This apparent movement of the "spot of light" from the neon bulb 32 will be the difference between synchronous speed and rotor speed, that is to say, the slip, and as will be understood by those skilled in the art, the rotation of the "spot of light" should be timed for a minute to get the slip. There will be a number of images depending upon the number of poles on the motor 24 being tested. All this will be visible in a room of ordinary illumination, without the need for darkening the room in any manner.

The operation may be improved by inserting a half-wave rectifier 87 in series with one line 84 or 86 supplying the neon bulb 32. This is shown in Figure 7 and essentially "eliminates" the alternate half of each cycle of the alternating current, no filter being used. As shown in Figure 8, a variable auto-transformer 105 may also be used to vary the voltage supplied to the neon bulb 32, the effect of changing the voltage being to vary the width of the "spot of light" from the neon bulb in each revolution. The "spot of light" is quite easily seen from several feet away, as in the direction of the arrow 20 of Figure 6, even in a brilliantly lighted room.

Although I have described my invention in specific terms, it will be understood that various changes may be made in size, shape, materials and arrangement without departing from the spirit and scope of the invention as claimed.

I claim:

1. An electric motor comprising a housing, a shaft journaled in said housing, induction means connectable to a source of alternating current for driving said electric motor shaft about its axis, and illuminating means including a glow lamp gas filled carried by said shaft and rotatable therewith eccentrically about the axis of said shaft, and actuated cyclically in phase with said source of alternating current from a source of power, for indicating visually the slip of said rotating shaft.

2. The construction according to claim 1, wherein said induction means comprises metallic cored primary and secondary coils forming the stator and rotor of said motive electrical device.

3. A slip determining device comprising an evacuated envelope filled with neon gas, a pair of electrodes spaced from each other and disposed in said envelope, means for securing said envelope upon the shaft of an electric motor driven by a first source of alternating current in radially spaced relationship to the axis of said shaft, means for supplying alternating current from a source cyclically in phase with said first source of alternating current, to said electrodes for illuminating said envelope upon exceeding the ionizing potential thereof, whereby, upon visual inspection of said assembly of shaft and cyclically illuminated envelope, any existing slip of said motor shaft upon rotation thereof is visually observable.

4. A slip determining device comprising a housing, means for securing said housing upon the rotatable shaft of a motor the slip of which is to be determined and driven by a first source of alternating current, an evacuated envelope secured to said housing means eccentrically of the axis of said shaft for rotation with said shaft about the axis of said shaft, said envelope being filled with neon gas, a pair of spaced electrodes disposed in said envelope and adapted to receive potential for ionizing said gas to produce illumination, means for supplying alternating current from a source to said electrodes for producing illumination cyclically at regular intervals and in phase with said first source of alternating current, whereby, upon rotation of said shaft and said evacuated envelope, the slip of said shaft is visually observable by observation of said evacuated envelope.

5. A slip determining device comprising a housing, means for securing said housing upon the rotatable shaft of a motor the slip of which is to be determined and driven by a first source of alternating current, an evacuated envelope secured to said housing eccentrically of the axis of said shaft for rotation with said shaft about the axis of said shaft, said envelope being filled with ionizable gas for producing illumination, a pair of spaced electrodes disposed in said envelope and adapted to receive potential for ionizing said gas to produce illumination, a pair of spaced slip rings connected to said spaced electrodes, brushes conductively engaging said slip rings, conduit means electrically connecting said brushes with a source of alternating current cyclically in phase with said first source of alternating current, whereby said envelope is cyclically illuminated while rotating with said motor shaft, whereby the slip of said motor shaft is visually observable by inspection of said illuminated envelope.

6. The construction according to claim 5, wherein said motor is a single phase induction motor.

7. The construction according to claim 5, wherein said motor is a polyphase induction motor.

8. The construction according to claim 5, characterized further in that said motor and said evacuated gas filled envelope electrodes are connected to the same alternating current source.

9. The construction according to claim 5, characterized further in that said housing comprises a cylindrical recess coaxial with the axis of said motor, said evacuated envelope being secured in said recess in a position eccentrically displaced from the axis of said motor shaft.

10. The construction according to claim 5, characterized further in that said housing comprises a tubular hollow member adapted to receive in one end thereof an outer portion of said motor shaft, means for securing said hollow member upon said shaft for rotation therewith, said evacuated envelope being disposed in said hollow tubular member near the open end thereof and visible from outside, whereby, upon rotation of said envelope with said shaft, any existent slip is visible upon the cyclic illumination of said envelope during its rotation.

11. The construction according to claim 3, wherein said device includes a rectifier connected intermediate said alternating current source and said evacuated envelope to rectify current delivered thereto.

12. The construction according to claim 3, wherein said device includes means for varying the voltage of the current delivered to said evacuated envelope electrodes, whereby the width of the "spot of light" from said illuminated envelope may be varied as the same rotates.

WILLIAM HANSEN HALL.

REFERENCES CITED

The following references are of record in the file of this patent:

UNITED STATES PATENTS

| Number | Name | Date |
|---|---|---|
| 1,895,925 | Hammond | Jan. 31, 1933 |
| 1,906,187 | Simmons | Apr. 25, 1933 |
| 2,070,623 | Satterlee | Feb. 16, 1937 |

OTHER REFERENCES

"Electrical World," page 99, July 29, 1939.